US012371246B2

(12) United States Patent
Kaminski

(10) Patent No.: US 12,371,246 B2
(45) Date of Patent: Jul. 29, 2025

(54) METHOD OF USING AN INFLATABLE PROTECTIVE PACKAGING FOR THE COLD CHAIN MARKETPLACE

(71) Applicant: Michael G Kaminski, Las Vegas, NV (US)

(72) Inventor: Michael G Kaminski, Las Vegas, NV (US)

( * ) Notice: Subject to any disclaimer, the term of this patent is extended or adjusted under 35 U.S.C. 154(b) by 0 days.

(21) Appl. No.: 18/675,450

(22) Filed: May 28, 2024

(65) Prior Publication Data

US 2024/0317480 A1 Sep. 26, 2024

Related U.S. Application Data

(62) Division of application No. 17/892,635, filed on Aug. 22, 2022, now Pat. No. 12,024,355.

(51) Int. Cl.

| | |
|---|---|
| ***B65D 81/38*** | (2006.01) |
| ***B31B 120/40*** | (2017.01) |
| ***B31D 5/00*** | (2017.01) |
| ***B65B 23/00*** | (2006.01) |
| ***B65B 25/00*** | (2006.01) |
| ***B65B 55/20*** | (2006.01) |
| ***B65D 81/03*** | (2006.01) |
| ***B65D 81/05*** | (2006.01) |

(52) U.S. Cl.

CPC ....... *B65D 81/3893* (2013.01); *B31D 5/0073* (2013.01); *B65B 23/00* (2013.01); *B65B 25/00* (2013.01); *B65D 81/052* (2013.01); *B31B 2120/40* (2017.08); *B65B 55/20* (2013.01); *B65D 81/03* (2013.01)

(58) Field of Classification Search

CPC ......... B65B 23/00; B65B 25/00; B65B 55/20; B65D 81/03; B65D 81/052; B65D 81/3893; B31B 2120/40; B31B 2120/402; B31D 5/0073

USPC ............................................................ 53/472

See application file for complete search history.

(56) References Cited

U.S. PATENT DOCUMENTS 5,489,464 A * 2/1996 Bjorck ................. B31D 5/0073 428/167
2003/0128898 A1* 7/2003 Malone et al. .... B65D 81/3895 383/3
2007/0221530 A1* 9/2007 Lee ...................... B65D 81/052 206/522
2009/0188824 A1* 7/2009 Velazquez et al. .... B65D 5/543 229/87.01
2013/0270145 A1* 10/2013 Takenaka ............. B65D 81/052 206/521

(Continued)

FOREIGN PATENT DOCUMENTS

CN 207242512 U * 4/2018 ......... B65D 81/3823

*Primary Examiner* — Stephen F. Gerrity

(74) *Attorney, Agent, or Firm* — Barry Choobin; Patent 360

(57) ABSTRACT

An insulative packaging for cold chain marketplace. The insulative packaging includes a base unit, a wall unit, and a top unit, which together form an enclosure. Each of the base unit, the wall unit, and the top unit has an inflatable liner, one or more insulative sheets, and a radiant barrier. The inflatable liner can be folded and the one or more insulative sheets can be sandwiched between the two folds of the inflatable liner. An article to be protected can be placed within the enclosure and insulative packaging can provide 360-degree insulation and protection.

7 Claims, 7 Drawing Sheets

(56) References Cited

U.S. PATENT DOCUMENTS

| | | | | |
|---|---|---|---|---|
| 2019/0062027 | A1* | 2/2019 | Kim ..................... | B65D 81/022 |
| 2019/0300260 | A1* | 10/2019 | Hashimoto et al. . | B65D 81/054 |

* cited by examiner

METHOD OF USING AN INFLATABLE PROTECTIVE PACKAGING FOR THE COLD CHAIN MARKETPLACE

CROSS-REFERENCE TO RELATED APPLICATIONS

This application is a divisional of a U.S. patent application Ser. No. 17/892,635 filed on Aug. 22, 2022, which is incorporated herein by reference in its entirety.

FIELD OF INVENTION

The present invention relates to inflatable packaging, and more particularly, the present invention relates to inflatable packaging for cold chains and the like industry.

BACKGROUND

The packaging is a means to protect an article from contamination, dirt, and damage. The packaging is of utmost significance in the manufacture, sale, and transport of articles. The primary purpose of the packaging is to protect an article from the environment. For example, packaging can protect an article from dust, water, etc. Also, the packaging has the primary function of protecting an article from external shocks and bumps. This function of packaging is of importance in the transportation of fragile articles which are very susceptible to damage during transportation. Good packaging can protect an article from damage due to shocks or bumps both during transportation and mishandling of the articles.

Insulative packaging is widely used in cold chains and the like industries. The insulative packaging includes an enclosure made from insulative material that prevents the transfer of heat in and/or out of the enclosure. Popular insulative materials commercially used include corrugated cardboard, Styrofoam, Expanded Polystyrene (EPS), and the like. The use of such materials creates a landfill issue and is environmentally unfriendly.

A need is therefore appreciated for insulative packaging for the cold chain marketplace that is devoid of the drawbacks of the known insulative packaging.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to insulative and inflatable protective packaging for the cold chain marketplace.

Another object of the present invention is that the packaging can protect against dirt and shocks.

Still, another object of the present invention is that the packaging is economical to manufacture.

A further object of the present invention is that the packaging is easy to use.

Yet another object of the present invention is that the packaging can be reused.

A further object of the present invention is that packaging can be recycled.

Still, a further object of the present invention is that packaging can be stored and transported in a compact form.

In one aspect, disclosed is an insulative packaging comprising a base unit, a wall unit, and a top unit, wherein the base unit, the wall unit, and the top unit together form an enclosure; each of the base unit, the wall unit, and the top unit comprises an inflatable liner; a layer of radiant barrier disposed on an exposed surface of each of the inflatable liner that forms an inner surface of the enclosure; and one or more insulative sheets between two layers of each of the inflatable liner. The radiant barrier envelops the inflatable liner. The one or more insulative sheets are bonded to the respective inflatable liner.

In one implementation, the base unit and the wall unit are integrally manufactured as a single unit. Alternatively, the top unit and the wall unit are integrally manufactured as a single unit. Alternatively the base unit and the wall unit are integrally manufactured as a single unit, and a line of weakness separates the top unit from the wall unit.

In one implementation, the inflatable liner comprises a gusset section that divides the inflatable liner into an upper portion and a lower portion, wherein the inflatable liner is configured to fold along the gusset section such that the lower portion folds over the upper portion. The upper portion and the lower portion are the two layers of the inflatable liner and the one or more insulative sheets are sandwiched between the upper portion and the lower portion of the folded inflatable liner. The base unit and the wall unit have a common air tube, the common air tube has an inflation port. The gusset section divides each inflatable tube of the respective inflatable liner into an upper straight portion and a lower straight portion, wherein the lower straight portion is offset relative to the upper straight portion. The lower straight portion is offset by half a width of the respective inflatable tube.

In one aspect, disclosed is a method for protecting a heat-sensitive material, the method comprising providing an insulative packaging as described above; laying the base unit over a bottom of a container; covering walls of the container using the wall unit; and covering an open top of the enclosure by the top unit. The base unit and the wall unit are integrally manufactured as a single unit, a line of weakness separates the top unit from the wall unit, wherein the method further comprises separating the top unit from the wall unit. The upper portion and the lower portion are the two layers of the inflatable liner, wherein the method further comprises inserting one or more insulative sheets between the upper portion and the lower portion of the folded inflatable liner.

In one aspect, disclosed is an inflatable liner comprising a plurality of inflatable tubes arranged side-by-side; and a gusset section that divides the inflatable liner into an upper portion and a lower portion, wherein the inflation liner is capable of folding along the gusset section such as the lower portion folds over the upper portion, wherein the gusset section divides each inflatable tube of the plurality of inflatable tubes into an upper straight portion and a lower straight portion, wherein the lower straight portion is offset relative to the upper straight portion. The lower straight portion is offset by about half the width of the inflatable tube.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
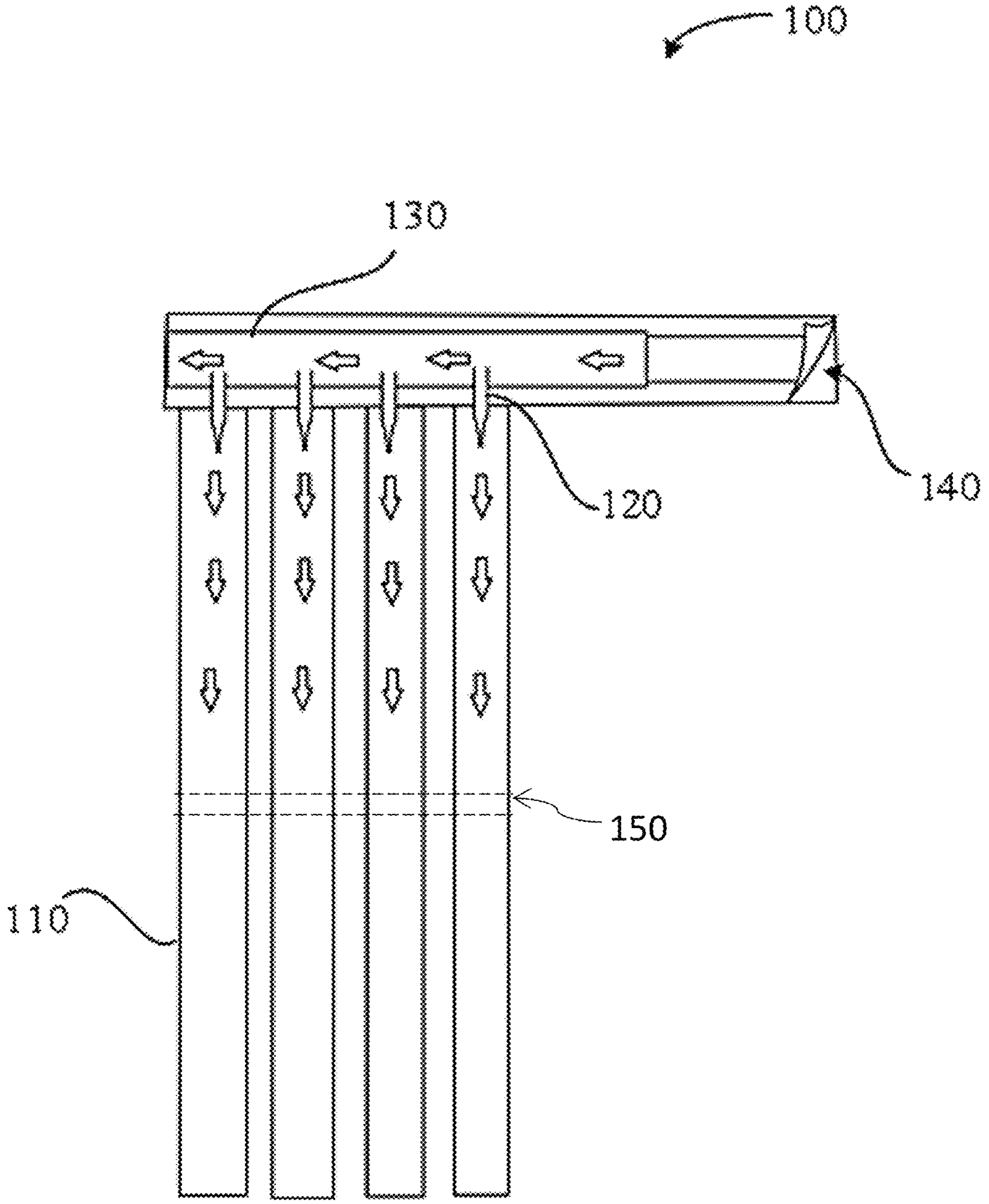
FIG. 1 is a schematic view showing inflatable tubes and an air tube of an inflatable liner, according to an exemplary embodiment of the present invention.

The subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

The described invention pertains to an inflatable and insulating protective packaging for cold chains and like industries. The disclosed packaging can provide protection against dirt, shocks, bumps, and the like. The disclosed packaging can also provide insulation, wherein the degree of insulation can be varied. The disclosed packaging can be adapted for different sizes and shapes of containers, such as square, rectangular, trapezoid, and the like. The packaging includes an outer layer of radiant barrier that can reflect thermal radiation and reduce heat transfer. Such layers of radiant barrier can be provided on one side or both sides of the units of the packaging. In one case, the radiant barrier can envelop the inflatable liner. The radiant barrier can envelop a single or multiple layers of inflatable liners. The radiant barrier can be made from materials, such as Mylar, aluminum mylar, and cotton. One or more insulative sheets can also be provided in each unit of the packaging. Examples of insulative materials can include fiber, such as denim, wool, fiberglass, gelatins, kraft paper, cardboard, varying foils, LDPE/HDPE/Nylon, and the like. The insulative sheet can be replaceable for different R-values. Generally, the higher the R-value is, the more is the insulation. A user can choose an insulative sheet for the desired R-value, thus making the packaging more versatile and economical in use. The inflatable liner that contains air can also provide a certain degree of insulation in addition to the radiant barrier and the insulative sheets. The inflatable liner can be filled with air, carbon dioxide, or any inert gas.

Referring to FIG. 1 which shows an exemplary embodiment of the inflatable liner 100. The inflatable liner can act as a protective buffer against any shocks and bumps that may otherwise damage an article contained in the bag. The inner inflatable liner includes a series of inflatable tubes 110 of prolonged cylindrical configurations that are arranged side by side. Each inflatable tube has an opening, preferably at its end. Each inflatable tube is in fluid communication with a common air tube 130. One end of the common air tube is closed while the other end forms an inflation port 140. The inflation port can be an aperture or slit through which air under pressure can be drawn into the common air tube and from the common air tube into the inflatable tubes resulting in their inflation. The opening of the inflation tubes can be interrupted by a check valve 120. The check valve, also known as a one-way valve can be configured at the opening of the inflatable tubes to allow air to enter the inflatable tubes but does not allow the filled air from the inflatable tubes to leak out through the opening. The use of a check valve is advantageous in prolonging the life of the inflatable liner and limiting the spread of any damage to the functional portion of the inflatable liner. This is because any leaked tube will not cause the deflation of the whole inflatable liner. Thus, one or two damaged tubes will not make the inflatable liner ineffective. Moreover, the inflatable liner can be removed, thus allowing the inflatable liner to be used again.

The inflatable tubes can either be mono-layer or coextruded: 3 layers, 5 layers, 7 layers, or 9 layers. For coextruded, a "tie layer" can be upwards of 10%, wherein the tie layer keeps the different extruded layers cohesively together. The inflatable liner can have a gusset section 150, wherein the gusset section imaginarily divides the inflatable liner into two halves, wherein the inflatable liner folds along the gusset section, and the two halves can collapse over each other.

The packaging can include a top unit, a wall unit, and a base unit, wherein the top unit, a wall unit, and a base unit can be assembled to form an enclosure. The base unit can form the bottom of the enclosure, the wall unit can form the walls or surroundings, and the top unit can cover the top of the enclosure, thus providing 360 degrees of protection and insulation. The three units can be separated and can be assembled on-site before use. Alternatively, two or three units can be integrally formed as a single unit. For example, the base unit and the wall unit can be integral, or the top unit and the wall unit can be integral.

The inflatable liner including the top unit, the wall unit, and the base unit can be stored and transported in uninflated form i.e., as sheets in rolled or stacked form, and the packaging can be inflated just before use.

Figure 2:
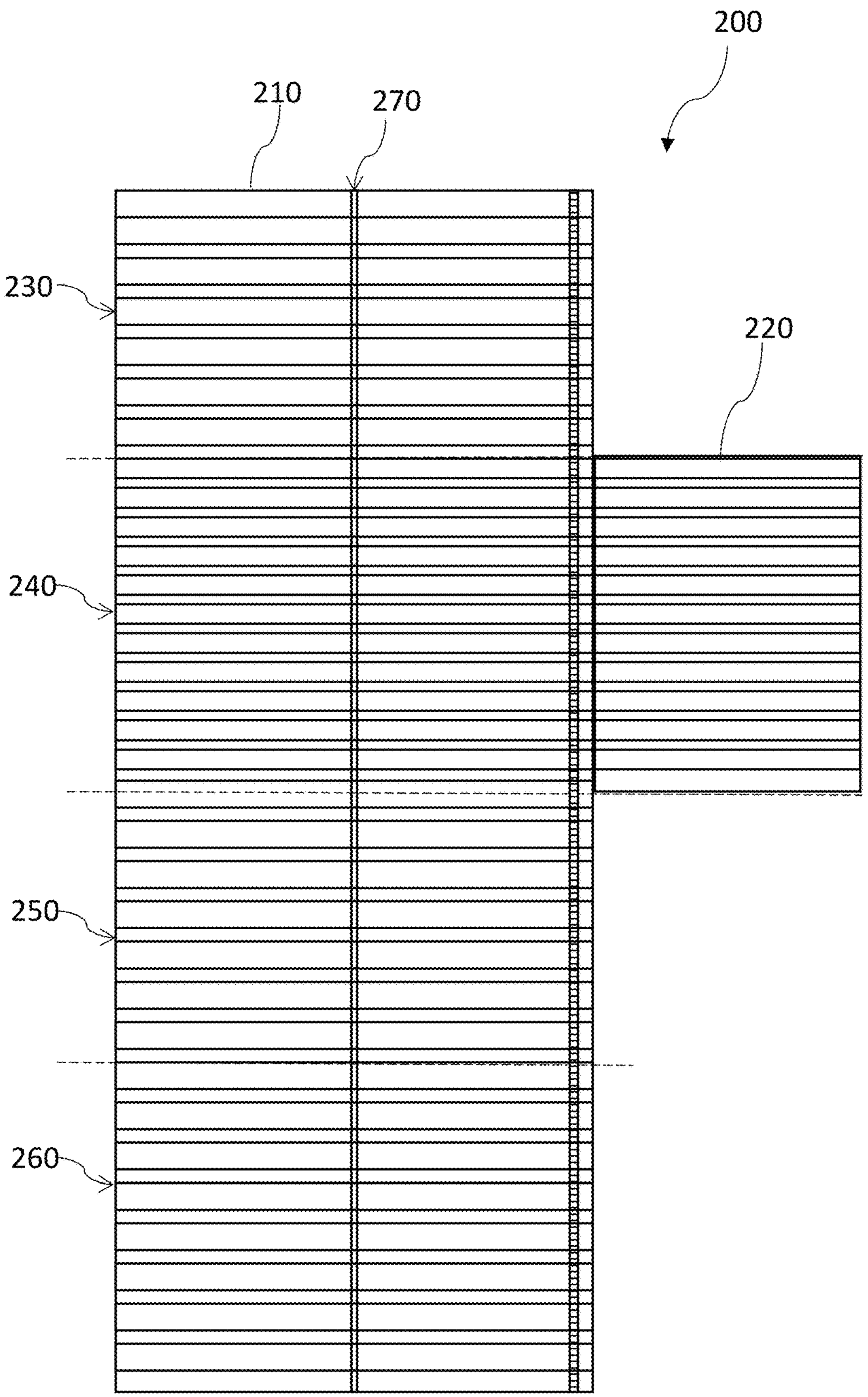
FIG. 2 is a line drawing showing a wall unit and base unit of the packaging, according to an exemplary embodiment of the present invention.

Referring to FIG. 2 which shows an inflatable liner 200 of the disclosed packaging that includes a wall unit 210 and the base unit 220. The base unit can be integral with the wall unit, and both can have a common air tube, this allows both the base unit and the wall unit to be filled once. The base unit can be folded towards the wall unit, such as up to 90 degrees, to form the base of the packaging enclosure, while the wall unit can form the walls of the enclosure. A separate top unit can then be placed to close the open top of the enclosure. It is to be understood, however, that the base unit can also be manufactured separately from the wall unit. Also, the wall unit and the top unit can be integrally formed. Also, the inflatable liner shown in FIG. 2 can have the top unit integrally formed with the wall unit, wherein the top unit can be provided at the end on the side of the wall unit that is opposite the base unit.

Figure 3:
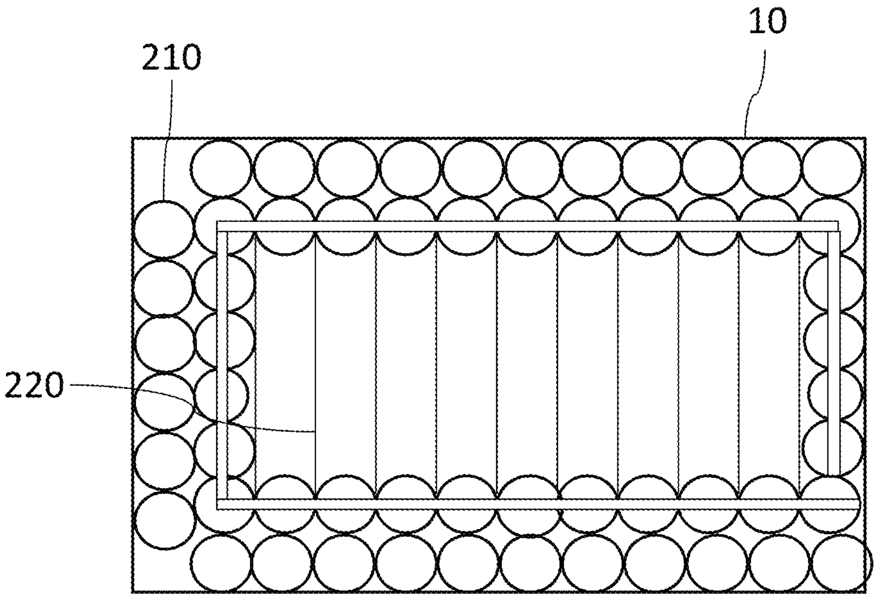
FIG. 3 is a top schematic view of the insulative packaging installed in a box, according to an exemplary embodiment of the present invention.
Figure 7:
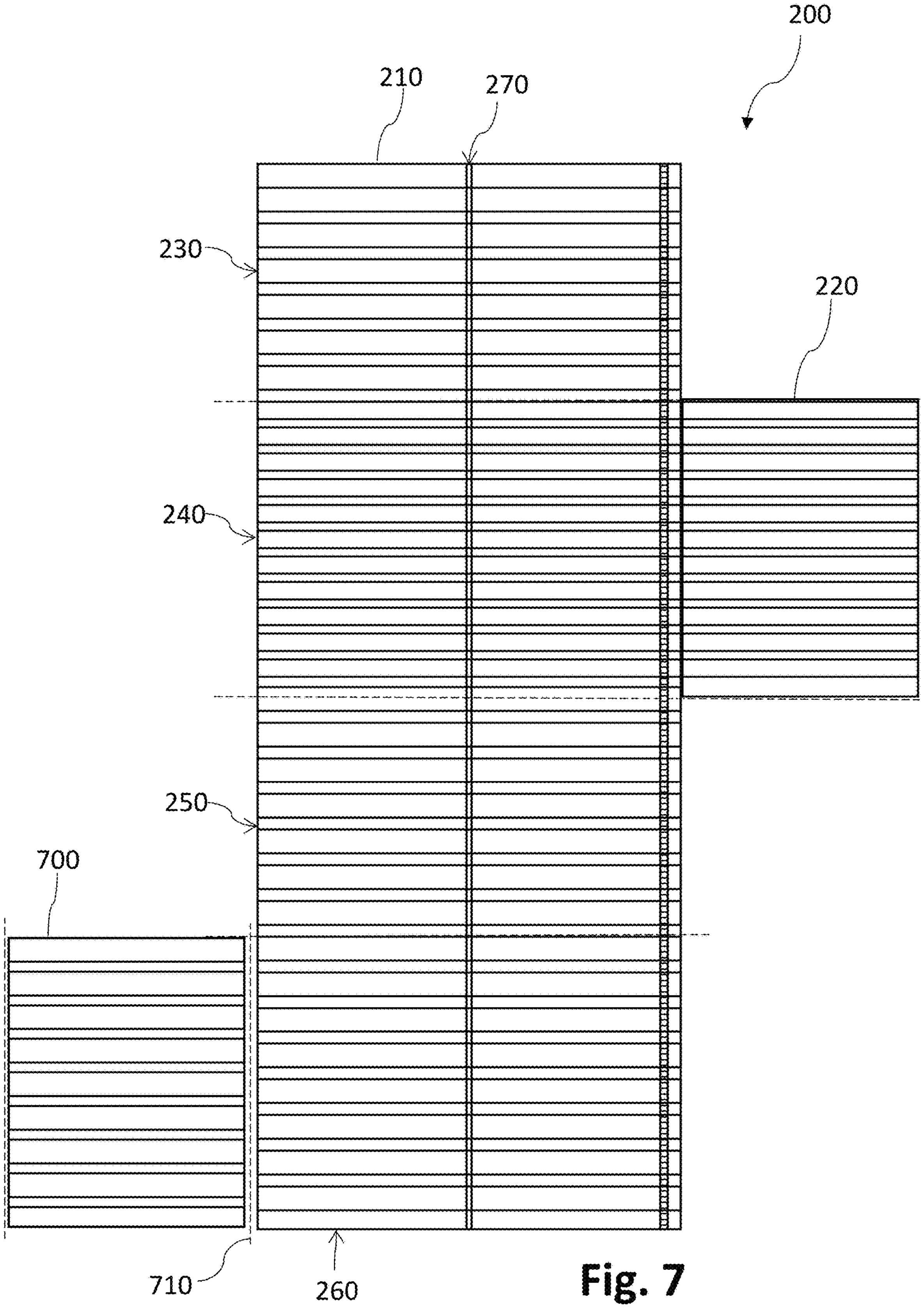
FIG. 7 is a line drawing showing the wall unit, the base unit, and a top unit of the packaging, according to an exemplary embodiment of the present invention

As shown in FIG. 3, to install the packaging of FIG. 2, the base unit 220 can be first placed at the bottom of container 10, thereafter, the wall unit 210 in the folded state can be installed to surround the inner volume of the container. The wall unit can be folded thrice to form four sections, a left wall section 230, a front wall section 240, a right wall section 250, and a rear wall section 260. The base unit 220 is shown in FIG. 2 which extends from the front wall section 240. If the inflatable liner also has an integral top unit, the top unit can extend from rear wall section 260 on the side that is opposite to the side attached to the base unit, provided the wall unit is installed in an unfolded state. In such an implementation, the integral top unit can also be connected to the common air tube, thus the top unit, wall unit, and base unit can all be inflated at once through a common inflation port. Referring to FIG. 7, in one implementation, the integral top unit 700 can be separable from the wall unit, such as a line of weakness 710 can be provided along which the top unit can be torn off from the wall unit, and the air tube of the top unit can also be separated from the common air tube. It is to be noted that the top unit with the line of weakness can be provided anywhere attached to the wall unit. Alternatively, the top unit can be manufactured separately from the wall unit and can be placed over the open top of the enclosure.

Figure 4:
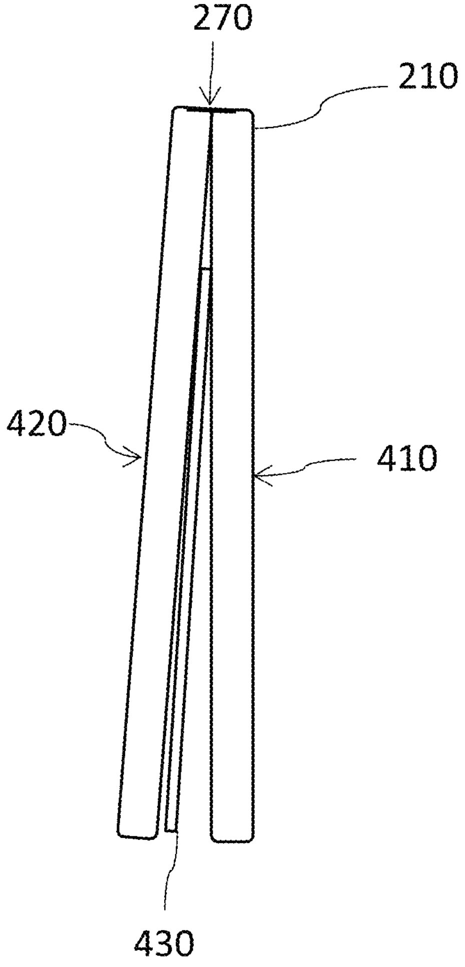
FIG. 4 is a section view of a wall unit of the packaging in a folded state and an insulation sheet sandwiched between the two halves, according to an exemplary embodiment of the present invention.

FIG. 2 also shows the wall unit has a gusset section 270 at the center along the length of the wall unit. This allows half of the wall unit to be folded over another half. FIG. 4 illustrates the folding of the lower half portion 410 of the wall unit over the upper half portion 420 along the gusset section 270. This creates two layers of the inflatable liner that provide more protection and insulation. The air between the two layers of the folded wall unit can also add to the insulation. One or more insulative sheets 430 can be sandwiched between the two halves of the wall unit. One or more insulative sheets can be inserted between the layers in a desired combination and quantity, for desired insulative properties. One or more insulative sheets can be an inserted substrate, such as a foil or panel. The one or more insulative sheets can be bonded to one or both layers of the folded wall unit, for example, the one or more insulative sheets can be bonded using an adhesive or heat sealed. It is to be noted that more than one insulative sheet can also be bonded together. Adhesives or similar bonding mechanisms can be pre-applied to one or more insulative sheets and protected by a release liner.

One or more layers of radiant barrier can be provided at least on an inner surface of the inflatable liner, the inner surface is that which forms an inner surface area of the packaging enclosure. Alternatively, each unit of the inflatable lines can be enveloped in the radiant barrier layers.

Figure 5:
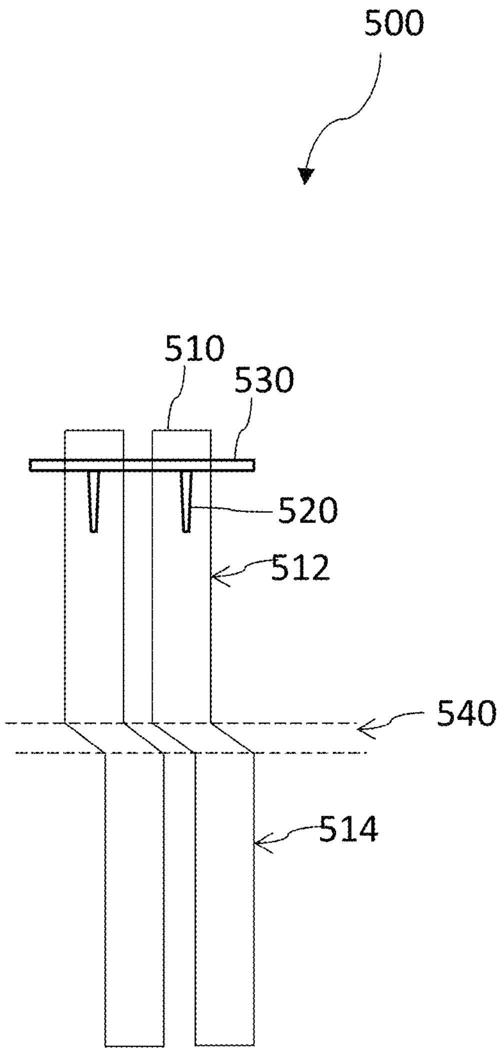
FIG. 5 shows another embodiment of the inflatable liner in which half portion of an inflatable tube is positioned offset relative to another half, according to an exemplary embodiment of the present invention.
Figure 6:
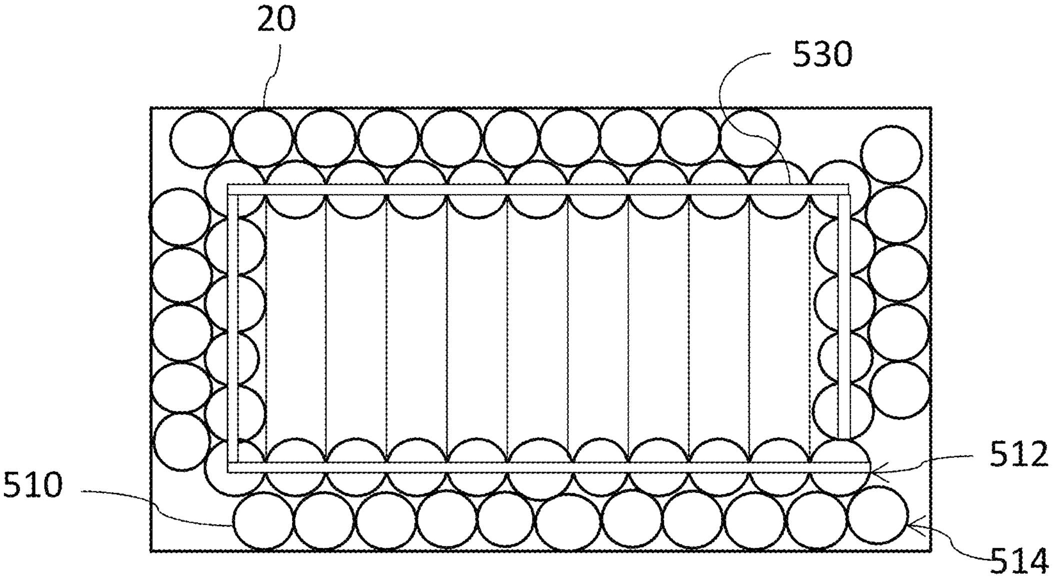
FIG. 6 is a top schematic view of the insulative packaging with the inflatable liner as shown in FIG. 5 and installed in a box, according to an exemplary embodiment of the present invention.

Referring to FIG. 5 which shows an alternate embodiment of the inflatable liner. FIG. 5 shows a section of an inflatable liner 500 that has an inflatable tube 510 arranged side-by-side, similar to the inflatable liner of FIG. 1. Each tube 510 has a one-way valve 520. A common air tube 530 is also shown that connects to the different inflatable tubes 510. The inflatable liner 500 can also have gusset section 540 that divides the inflatable liner into two halves that can be folded along the gusset section. Unlike the inflatable liner shown in FIG. 1, the inflatable tubes 510 are not straight, but a lower straight portion 514 of each inflatable tube 510 is offset relative to the upper straight portion 512 of the inflatable tube 510. The lower straight portion 514 can be offset about half the width of the inflatable tube 510. When the inflatable liner 500 is folded, the lower straight portion of each inflatable tube overlies between two upper straight portions, i.e., between the upper straight portion of the same inflatable tube and an upper straight portion of an adjacent inflatable tube. The inflatable liner 500 can be embodied in either or all of the base units, the wall unit, and the top unit of the packaging enclosure. FIG. 6 illustrates the installation of the inflatable liner 500 as the wall unit in a box 20.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for protecting a heat-sensitive material, the method comprising:

providing an insulative packaging comprising:

a base unit and a wall unit, wherein the base unit and the wall unit together form an enclosure, wherein the base unit and the wall unit are integrally manufactured as a single unit, each of the base unit and the wall unit comprises an inflatable liner comprising a series of inflatable tubes, wherein the inflatable liner of the wall unit comprises a gusset section, the gusset section divides each inflatable tube of the inflatable liner of the wall unit into an upper straight portion and a lower straight portion, wherein the lower straight portion of each inflatable tube is offset relative to the upper straight portion of each inflatable tube in a plane of the respective inflatable tube, and the upper straight portion and the lower straight portion of each respective inflatable tube are parallel to each other, a layer of radiant barrier disposed on an exposed surface of each of the inflatable liner that forms an inner surface of the enclosure, one or more insulative sheets sandwiched between the lower portion and the upper portion, and a top unit;

laying the base unit over a bottom of a container;

covering walls of the container by the wall unit; and covering an open top of the enclosure by the top unit.

2. The method according to claim 1, wherein the radiant barrier envelops the inflatable liner.

3. The method according to claim 1, wherein the one or more insulative sheets are bonded to the respective inflatable liner.

4. The method of claim 1, wherein the top unit and the wall unit are integrally manufactured as a single unit.

5. The method according to claim 4, wherein a line of weakness separates the top unit from the wall unit, wherein the method further comprises:

separating the top unit from the wall unit.

6. The method according to claim 5, wherein the base unit and the wall unit have a common air tube, the common air tube has an inflation port.

7. The method according to claim 1, wherein the lower straight portion is offset by half a width of the respective inflatable tube.

* * * * *